July 10, 1945.    H. R. VAN VLECK    2,379,940
POWER TAKE-OFF
Filed June 25, 1941    2 Sheets-Sheet 1
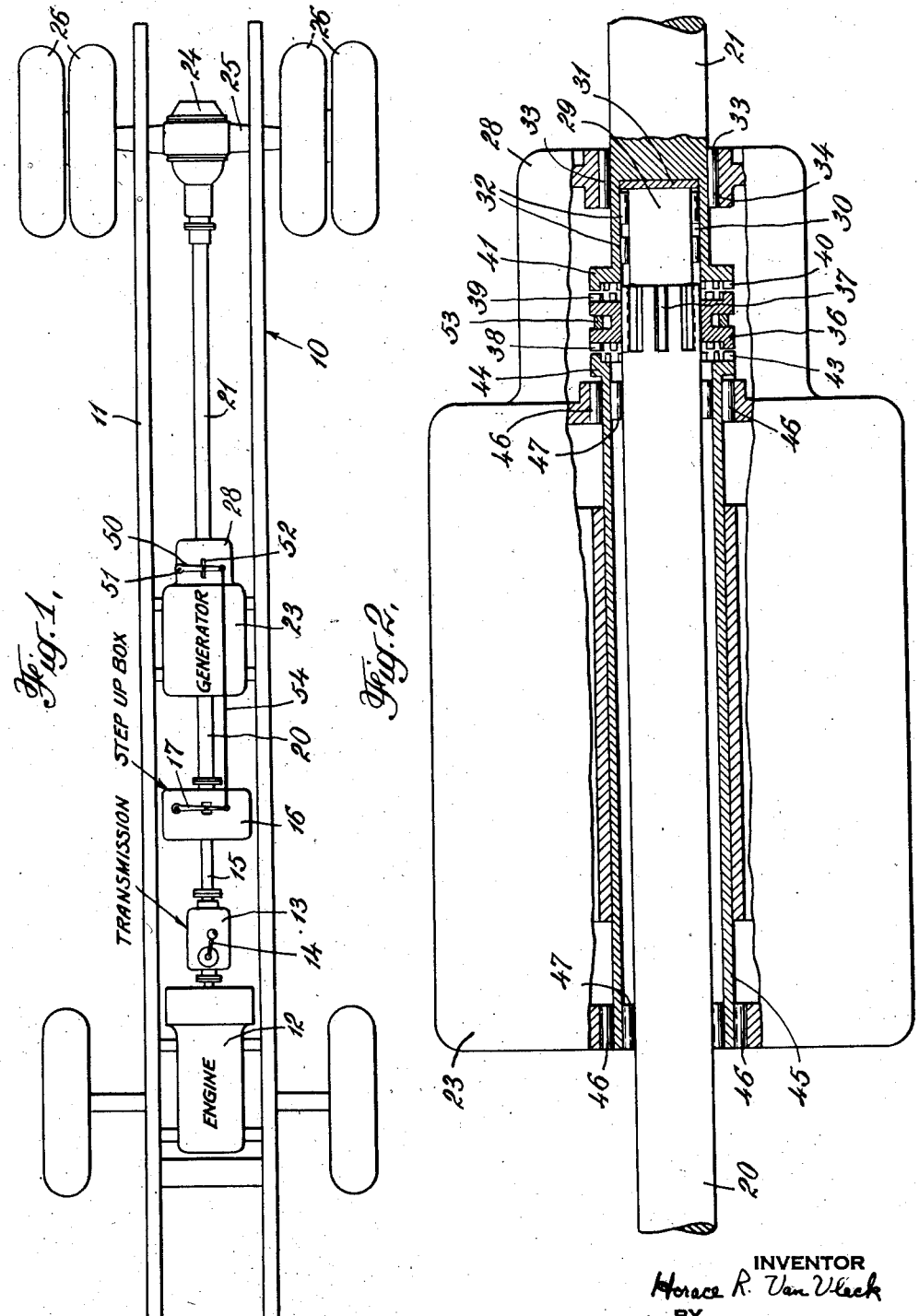
INVENTOR
Horace R. Van Vleck
BY
Pennie Davis Marvin + Edmonds
ATTORNEYS

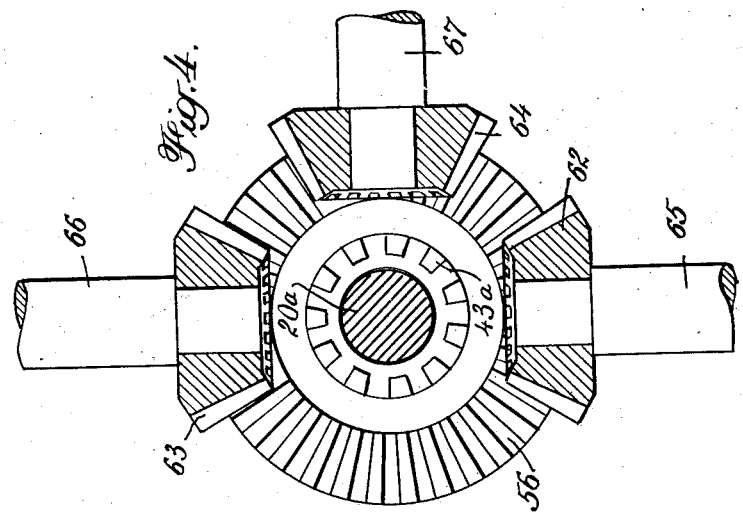
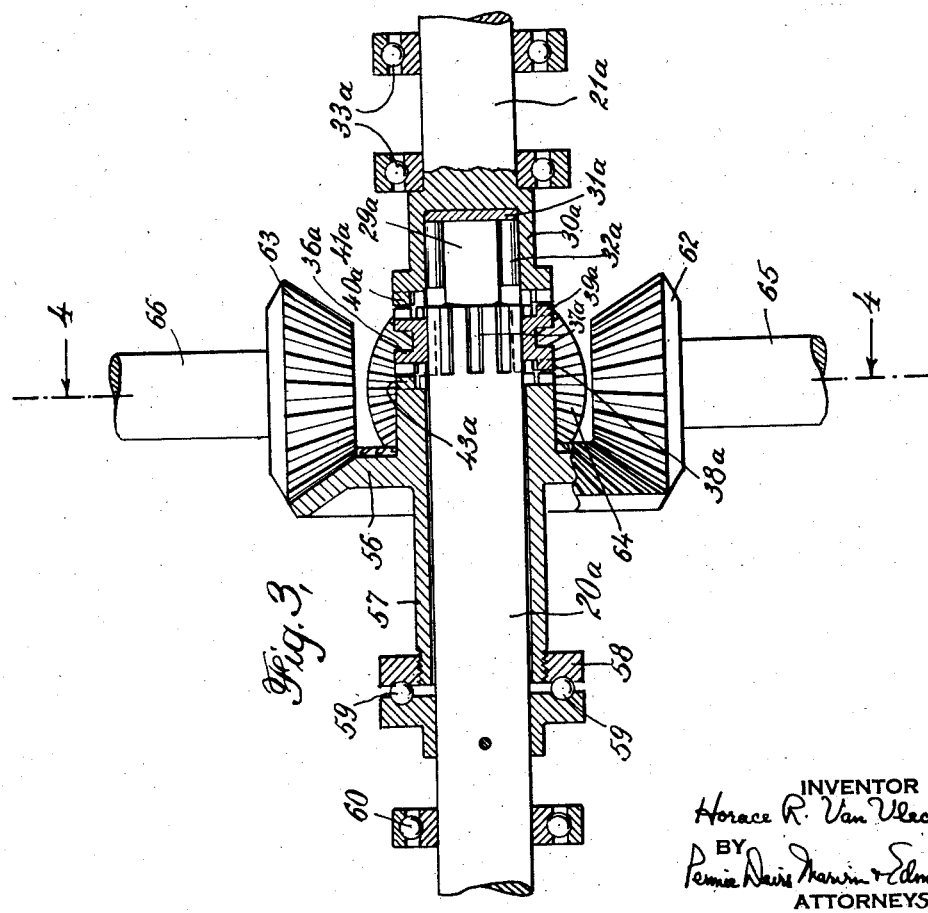

Patented July 10, 1945

2,379,940

UNITED STATES PATENT OFFICE 2,379,940

POWER TAKE-OFF

Horace Russ Van Vleck, Upper Montclair, N. J.

Application June 25, 1941, Serial No. 399,625

2 Claims. (Cl. 180—53)

This invention relates to power take-off mechanisms and more particularly to a novel mechanism of this type which may be operated from a vehicle engine, or the like, to drive a generator, a pump or other device at a speed in excess of the engine speed and with a power output which may be varied without changing the speed. The new mechanism is simple and compact in construction and may be operated easily and with safety by reason of its inclusion of automatic means for disconnecting the vehicle driving wheels or other propelling device from the engine when the power take-off is started in operation.

One feature of the invention resides in the provision of a novel power take-off for vehicles which includes selector means for operating the take-off mechanism while disconnecting the vehicle propelling device from the engine, or connecting the propelling device to the engine while maintaining the take-off mechanism inoperative, but which positively prevents simultaneous operation of the take-off mechanism and the propelling device. In accordance with my invention, the connection between the engine and the propelling device includes a drive shaft having two independent sections, one of which is a driving section rotatable by the engine through a suitable connection and the other of which is a driven section connected to the propelling device. The power take-off mechanism includes a driven element with relation to which the drive shaft is rotatable, and selector means for connecting the driving section of the shaft to either the driven element of the take-off or the driven section of the shaft. Preferably, the driven element of the take-off is concentric to the vehicle drive shaft, and the selector means includes a clutch member rotatable with the driving section of the shaft and engageable selectively with coacting clutch members on the driven element of the take-off and the driven section of the shaft, respectively. The driven element of the take-off may be connected to a device to be driven, such as a generator or a pump.

With this construction, the driving section of the vehicle shaft is adapted to drive either the propelling device or the take-off mechanism but not both. Accordingly, accidental movement of the vehicle by the engine during operation of the take-off is impossible. This is of particular advantage in the use of the take-off on a truck, for example, to drive auxiliary equipment when the truck is stationary, because in the operation of such auxiliary equipment a dangerous condition may arise from slight movement of the truck due to accidental shifting of the usual transmission gearing from "neutral" when the engine is driving the equipment. Likewise, with the new construction it is impossible while the vehicle is in transit to drive the auxiliary equipment accidentally with possible resulting injury to the equipment. The connection between the engine and the take-off is the usual power transmission of the vehicle, and, therefore, is sufficiently strong and does not require additional parts. When the take-off is used on trucks or other vehicles having a variable speed transmission between the engine and the drive shaft, the take-off may be driven at different speeds by simply shifting the gears of the transmission in the usual manner.

Another feature of the invention resides in the provision of a novel power take-off in which the speed ratio between the driving section of the vehicle drive shaft and the engine is increased when the selector means is moved to disconnect the driven section of the shaft and connect the driven element of the take-off. In one form of my invention, a step-up gear box is disposed in the connection between the engine and the driving section of the shaft and is provided with a control member having a low speed and a high speed position. When the selector means connects the driving section of the shaft to the driven section and the propelling device, the control member of the step-up box is in its low speed position. However, when the selector means is shifted to connect the driven element of the take-off to the driving section of the shaft, the control member is shifted to its high speed position, whereby the take-off is operated at high speed while the engine is idling. If desired, the selector means of the take-off and the control member of the step-up gear box may be connected together so that the control member is shifted automatically when the selector means is operated.

In the use of the power take-off of my invention on the usual ground vehicles having a variable speed transmission, the power delivered by the take-off may be increased without changing the speed of operation of the take-off by simply moving the gear shift of the transmission to a lower speed position and increasing the engine speed sufficiently to counteract the reduction in the speed ratio. Conversely, the power delivered by the take-off may be decreased without changing its speed, by moving the gear shift to a higher speed position and reducing the engine speed.

These and other features of the invention may be better understood by reference to the accompanying drawings, in which Fig. 1 is a plan view of a truck chassis on which is mounted one form of the invention for driving an auxiliary generator;

Fig. 2 is a top view partly in section showing the generator of Fig. 1 with the drive shaft extending through it;

Fig. 3 is a side view partly in section showing a modified form of the power take-off, and Fig. 4 is a sectional view on the line 4—4 in Fig. 3.

Referring to Figs. 1 and 2, I have shown by way of illustration one form of the take-off mechanism on a truck chassis 10 mounted comprising a frame 11. An engine 12 on the chassis has its crankshaft connected through a suitable clutch (not shown) to a variable speed transmission 13. The transmission 13 may be of the usual type having a gear shift lever 14 movable selectively from a neutral position to reverse, low speed, second speed or high speed positions. The driven element of the transmission is coupled to a shaft 15 extending into a step-up gear box 16 containing gears (not shown) which may be arranged to drive at either low speed or high speed depending upon the position of a control lever 17 on the outside of the box. Coupled to the driven element in the gear box 16 is a propeller shaft or drive shaft including two independent sections 20 and 21. The drive shaft 20, 21 extends through an auxiliary generator 23 mounted on the vehicle frame, the rear section 21 of the shaft being connected through a differential 24 and a rear axle 25 to the rear wheels 26 of the vehicle. The generator 23 is independent of the usual generator for charging the storage battery on the vehicle and is used to supply current to electrical equipment, such as an electric motor for operating a pump to deliver the contents of a tank on the chassis.

The housing of generator 23 is provided with an extension 28 which encloses the adjacent ends of the drive shaft sections 20 and 21, as shown in Fig. 2. At its rear end, the front or driving section 20 of the shaft is formed with a reduced extension 29 received in a socket 30 on the adjacent end of the rear or driven section 21. A thrust plate 31 is disposed between the end of extension 29 and the closed end of socket 30, and the extension 29 is supported in the socket by roller bearings 32. The rear section 21 of the shaft is supported by roller bearings 33 mounted in a suitable raceway 34 in the housing extension 28.

On the front section 20 of the drive shaft directly in front of socket 30 is a double-acting clutch member 36 splined to the section 20 by keys 37. The front face of the clutch member is provided with clutch teeth 38, and the rear face is provided with clutch teeth 39 engageable with coacting clutch teeth 40 on a circumferential flange 41 at the adjacent end of shaft section 21. The clutch teeth 38 are engageable with coacting clutch teeth 43 on a circumferential flange 44 at the rear end of a sleeve 45 extending axially through the generator and concentric to shaft section 20. At its opposite ends, the sleeve 45 is supported by roller bearings 46 mounted in suitable raceways in the generator, and preferably a thrust bearing (not shown) is provided to take up the forward thrust of sleeve 45 when its clutch teeth are engaged by clutch member 36. The front section 20 of the drive shaft may be supported in the sleeve 45 by roller bearings 47. Intermediate its ends, the sleeve 45 supports the usual rotatable windings (not shown) of the generator.

The clutch member 36 is movable axially on shaft section 20 to engage either the clutch teeth 40 on the rear section of the drive shaft or the clutch teeth 43 on sleeve 45. Any desired means may be employed to shift the clutch member from one position to the other. As shown in Fig. 1, I provide for this purpose a lever 50 pivotally mounted at 51 on the extension 28 of the generator housing and connected intermediate its ends through a slot 52 in the housing to a yoke 53, the arms of which are engaged in a circumferential groove in the clutch member 36. If desired, the free end of lever 50 may be connected by a link 54 to the control lever 17 of the step-up gear box 16, and the lever 50 may be provided with an operative connection to a handle in the truck cab (not shown).

In operation, when the vehicle is in transit the clutch member 36 engages clutch teeth 40 on the rear section 21 of the drive shaft, so that the engine drives the rear wheels 26 through the transmission 13, step-up gear box 16, drive shaft 20, 21, differential 24 and rear axle 25. In this position of clutch member 36, the control lever 17 of the step-up gear box is in its low speed position which preferably gives a one-to-one speed ratio between shafts 15 and 20. With the clutch member 36 in this position, it is impossible for the engine to drive the generator 23 because the clutch teeth 38 are disengaged and spaced from the clutch teeth 43 on the sleeve 45 which drives the rotatable windings of the generator. When the vehicle has reached its destination and it is desired to operate the generator 23, the lever 50 is shifted to disengage the clutch member 36 from teeth 40 and engage it with teeth 43 on sleeve 45. At the same time, the control lever 17 of the step-up gear box is shifted to its high speed position which causes shaft section 20 to rotate at a higher speed than the shaft 15. The clutch between the engine and transmission 13 is then engaged with the gear shift lever 14 in one of its operating positions, such as the high speed position, whereby the engine drives the generator 23 through transmission 13, shaft 15, step-up gear box 16, front section 20 of the drive shaft, clutch 36 and sleeve 45. It will be apparent that with the clutch member 36 in this position it is impossible for the engine to drive the rear wheels 26 because clutch teeth 39 are disengaged and spaced from the clutch teeth 40 on the drive shaft section 21. Because of the step-up gear box 16 the generator 23 is driven at a considerably higher speed than the speed of the engine 12, and, therefore, the engine may be idled while the generator is operating.

When it is desired to increase the power supplied to the generator without increasing the speed of the generator, the gear shift lever 14 is shifted from the high speed position to one of the lower speed positions and the engine 12 is accelerated sufficiently to counteract the decreased speed ratio of the driving connection between the engine and shaft 15. Thus, assuming that the transmission 13 has three different speeds, power may be delivered to the generator 23 in any one of three different amounts without changing the speed of the generator. This is of particular advantage when the generator is used for energizing various electrical units and the demand on the generator is different for each unit. When the demand is heavy, the transmission is shifted to the low speed position and the engine is operated at a relatively high speed, while with a lower current demand the transmission may be shifted to a higher speed position and the engine decelerated. Accordingly, with the new take-off mechanism a generator of relatively large capacity, for example, seven to ten kilowatts, may be operated at substantially constant speed even though the demand on it varies over a wide range.

The generator 23, which is preferably of the dust-proof and flame-proof type, not only serves as a source of power from the take-off mechanism but also contributes to the support of the drive shaft 20, 21. Also, it houses the clutch between the two sections of the drive shaft, although it will be understood that any other suitable casing may be employed for this purpose. While I have shown the generator 23 disposed intermediate the ends of the drive shaft 20, 21, it may be arranged further toward the front of the vehicle so that the front section 20 of the drive shaft extends directly into the generator and is not exposed. The rear section 21 may then be encased in the usual torque tube extending between the differential 24 and the generator. Since the generator is mounted at the same height as the drive shaft 20, 21, there is ample road clearance.

In the construction shown in Figs. 3 and 4, the drive shaft comprises two independent sections 20a and 21a arranged end to end, the section 20a having a reduced portion 29a received in a socket 30a at the adjacent end of the rear section 21a. A thrust plate 31a is disposed between the end of the socket 30a and the rear end of the reduced portion 29a, and the reduced portion is supported in the socket by roller bearings 32a. The rear section 21a of the drive shaft may be provided with additional supporting means in the form of radial bearings 33a. A clutch member 36a is splined to the front section of the drive shaft by keys 37a and is provided on its opposite faces with clutch teeth 38a and 39a, respectively. The teeth 39a are engageable with clutch teeth 40a on a circumferential flange 41a at the adjacent end of the rear section 21a of the shaft.

The teeth 38a on the clutch member are engageable with clutch teeth 43a on the hub of a bevel gear 56 mounted loosely on the drive shaft section 20a. Extending forwardly from the gear 56 is an integral sleeve portion 57 on the end of which a plate 58 is threaded, the plate being engaged by thrust bearings 59 which take up the thrust incident to engagement of the clutch member with teeth 43a. In front of the thrust bearing 59, the shaft section 20a may be supported by radial bearings 60.

Meshing with the bevel gear 56 are smaller bevel gears 62, 63 and 64 mounted on shafts 65, 66 and 67, respectively, journaled on the frame of the vehicle. These shafts may be connected to power operated devices, such as pumps, generators, air compressors, etc. While I have shown three bevel gears driven by the gear 56, it will be understood that any desired number of gears may be used to provide multiple power take-offs from the drive shaft 20a, 21a. Also, while the power take-off shafts 65, 66 and 67 are shown extending at right angles to the main drive shaft, they may be made to extend at any desired angle relative thereto by employing gears 62, 63 and 64 of the proper bevel angle. Since the gears 62, 63 and 64 are considerably smaller in diameter than the driving gear 56, the power take-off shafts 65, 66 and 67 are operated at much higher speed than the drive shaft 20a, 21a, and it is therefore unnecessary to use a step-up gear box such as that shown at 16 in Fig. 1.

The operation of the take-off mechanism shown in Figs. 3 and 4 is generally similar to that shown in Fig. 1 and will be readily understood. When the clutch member 36a is moved into engagement with teeth 40a, the rear wheels or other propelling means of the vehicle are driven through the rear section 21a of the drive shaft, and the driving gear 56 of the power take-off is inoperative. However, when the clutch member 36a is moved into engagement with teeth 43a, the driving gear 56 of the take-off is driven directly from the front section 20a of the drive shaft, while the rear section 21a and the propelling means are inoperative. Because of the bevel gears 56, 62, 63 and 64, the drive from the shaft section 20a to the auxiliary power-driven devices is substantially noiseless.

It will be apparent that the power take-off of my invention is efficient and extremely flexible in that it may be operated at different power output values without changing its speed, by manipulation of the usual throttle and gear shift lever of the vehicle, or it may be operated at different speeds. The speed step-up mechanism between the engine and the unit driven by the power take-off permits operation of the unit at relatively high speed with the engine idling, whereby the operation is at low cost.

I claim:

1. In a power take-off device, the improvement comprising a housing, a generator mounted in the housing, a drive-shaft extending into one end of the housing, a sleeve in operative connection with the generator, the sleeve extending axially through the generator and concentric to the drive-shaft, the drive-shaft being rotatable relative to the sleeve, a roller-bearing assembly mounted between the drive-shaft and the sleeve, a roller-bearing assembly mounted between the sleeve and a journal forming an integral portion of the housing, a circumferential power take-off gear integrally mounted on the inner end of the sleeve, a driven-shaft extending into the opposite end of the housing in axial alignment with the drive-shaft, a roller-bearing assembly mounted between the driven-shaft and a journal forming an integral portion of the housing, the inner end of the driven-shaft terminating in a hollow socket and the inner end of the drive-shaft fitting into the hollow socket, a roller-bearing assembly mounted between the inner end of the drive-shaft and the hollow socket of the driven-shaft, a circumferential propelling gear integrally mounted on the inner end of the driven-shaft, a clutch slidably mounted on and rotatable with the drive-shaft intermediate the hollow socket of the driven-shaft and the power take-off gear, clutch teeth circumferentially spaced on one side of the clutch adapted operatively to mesh with the teeth of the power take-off gear mounted on the sleeve, clutch teeth circumferentially spaced on the other side of the clutch adapted operatively to mesh with the teeth of the propelling gear mounted on the driven-shaft, a shifter associated with the clutch adapted selectively to slide the clutch laterally into and out of operative engagement with the power take-off gear and into and out of operative engagement with the propelling gear so that simultaneous operation of the generator and the propelling gear is prevented.

2. A power take-off device according to the preceding claim, in which the shifter is operatively connectable with means for increasing the speed of the drive-shaft when the clutch is placed in engagement with the power take-off gear, so that the rotation of the sleeve may be speeded when it is desired to operate the generator.

HORACE RUSS VAN VLECK.